US005078761A

United States Patent [19]

Dyson

[11] Patent Number: 5,078,761

[45] Date of Patent: Jan. 7, 1992

[54] SHROUD

[75] Inventor: James Dyson, Bath-Avon, England

[73] Assignee: Notetry Limited, Bradford House, England

[21] Appl. No.: 621,375

[22] Filed: Dec. 3, 1990

Related U.S. Application Data

[63] Continuation-in-part of Ser. No. 549,080, Jul. 6, 1990.

[51] Int. Cl.[5] .............................................. B01D 45/12

[52] U.S. Cl. ........................................ 55/213; 55/337; 55/345; 55/429; 55/459.1; 55/DIG. 3

[58] Field of Search .................... 15/353; 55/213, 215, 55/216, 337, 345, 429, 452, 459.1, 459.3, DIG. 3

[56] References Cited

U.S. PATENT DOCUMENTS 4,643,748 2/1987 Dyson .............................. 55/345 X 4,853,008 8/1989 Dyson .................................. 55/345

*Primary Examiner*—Charles Hart

*Attorney, Agent, or Firm*—Ian C. McLeod

[57] ABSTRACT

A disc-shaped shroud having a cylindrical section (50*c*, 132) adjacent to an inner surface (15*b*, 111*b*) of a cyclonic container (15, 111) including a preferred combined shroud and disc unit (50) for use in a dual inner and outer cyclonic vacuum cleaner (10) is described. The combined shroud and disc unit fits on the outside surface (20*c*) of the inner cyclone (20) and aids in removal of dirt and fibrous matter from the airflow in the outer cyclone (15). Improved airflow between the outer cyclone (15) and inner cyclone (20) is achieved because of the shroud and disc unit (50).

38 Claims, 8 Drawing Sheets

SHROUD

CROSS-REFERENCE TO RELATED APPLICATION

This application is a continuation-in-part of U.S. application Ser. No. 07/549,080, filed July 6, 1990.

BACKGROUND OF THE INVENTION (1) Field of the Invention

The present invention relates to an improved shroud for a dual inner and outer cyclonic cleaning apparatus. In particular, the present invention relates to a shroud which has a perforated section that is parallel with and purposely spaced from the inside surface of the outer cyclone or container and which allows air to pass into a frusto-conically shaped inner cyclone without plugging the inlet openings to the inner cyclone through the apparatus.

(2) Prior Art

Cyclonic vacuum cleaning apparatus are shown in my U.S. Pat. Nos. 4,573,236; 4,593,429; 4,571,772; 4,643,748; 4,826,515; 4,853,011 and 4,853,008. My U.S. Pat. No. 4,853,008 describes a dual cyclonic cleaning apparatus wherein a combined disc and shroud unit is mounted on the outside of the inner cyclone in order to retain dirt in an outer cyclonic cleaner. The shroud has a perforated lower section adjacent to and above the disc which is parallel to the conical outside surface of the cyclone. The perforated section acts as an air inlet to the inner cyclone while the disc keeps large dirt particles and fibrous matter in the outer cyclone. The combined disc and shroud work well; however, there was a need for an improved design which would not allow the shroud perforations to be filled with dirt before the outer cyclone was full of separated dirt.

OBJECTS

It is therefore an object of the present invention to provide an improved cleaning apparatus wherein the shroud is designed to substantially reduce the tendency for dirt particles and fibrous matter to obstruct the shroud openings leading to the inner cyclone air inlet. Further, it is an object of the present invention to provide a combined disc and shroud which is easily mounted on the outside of the inner cyclone. Still further, it is an object of the present invention to provide an improved shroud which is simple and inexpensive to construct and easy to clean and which at the same time prevents escape of fibrous matter from the outer cyclone. These and other objects will become increasingly apparent to those skilled in the art and by reference to the drawings.

IN THE DRAWINGS

FIG. 1 is a left side perspective view of a preferred upright type vacuum cleaning appliance of the present invention, particularly showing an outer cyclone 15 surrounding the combined shroud and disc unit 50 mounted on the outside of an inner cyclone 20.

FIG. 2 is a front cross-sectional view along line 2—2 of FIG. 1 showing the shroud and disc unit 50 positioned between the inner cyclone 20 and the outer cyclone 15.

FIG. 2A is a front cross-sectional view along a plane perpendicular to line 2—2 of FIG. 1 showing the spring catch 55 for removing the outer cyclone 15 and receiver 140 from the inner cyclone 20.

Figure 3:
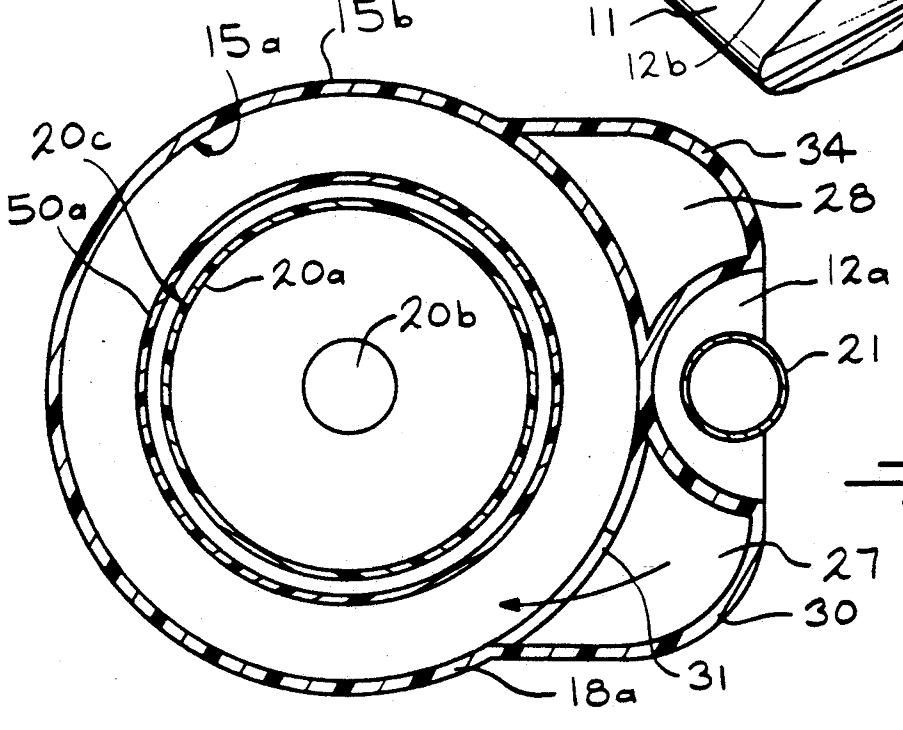
Figure 2:
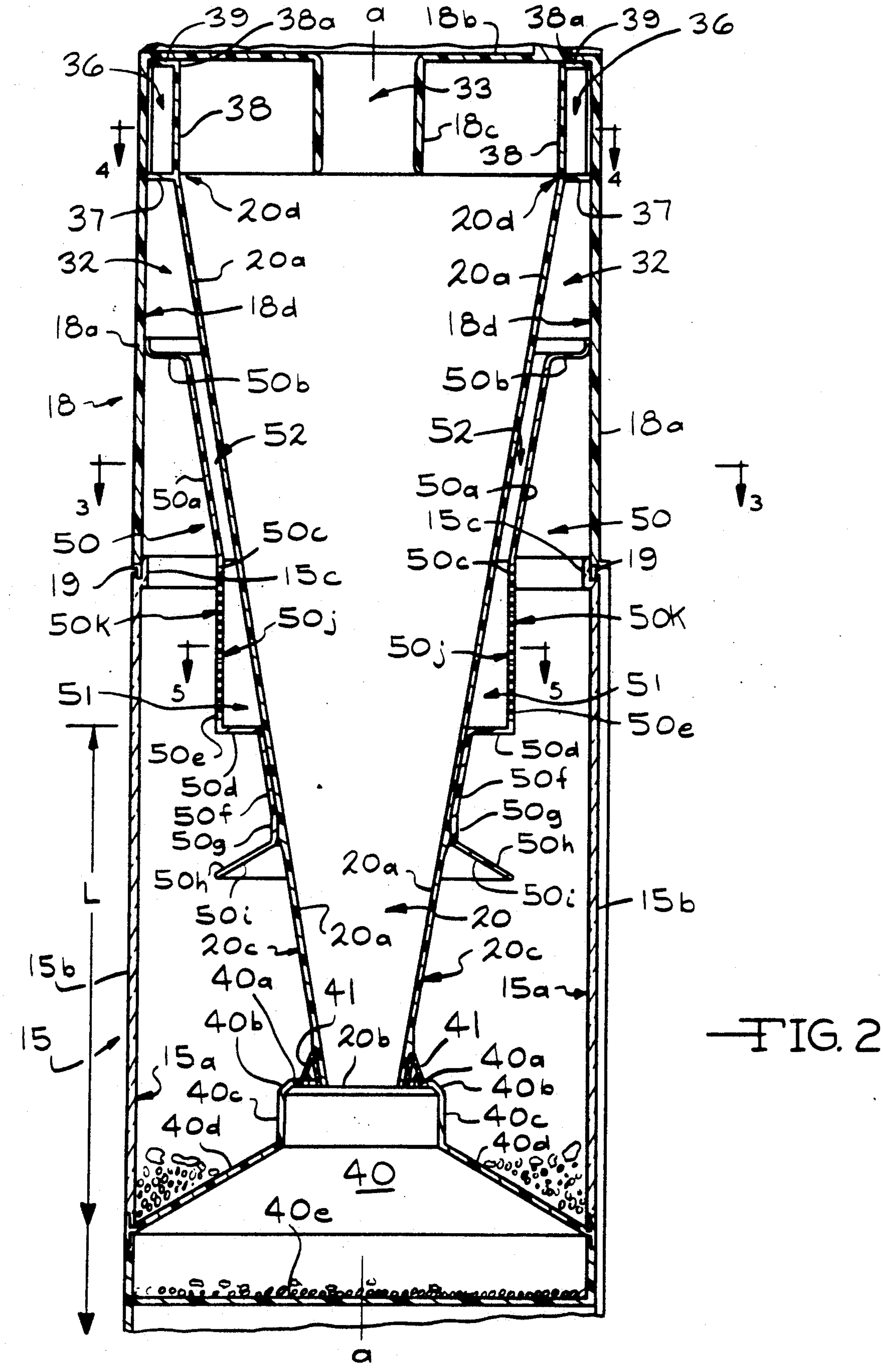
FIG. 2B is a front cross-sectional view along line 2—2 of FIG. 1 showing another version of the shroud and disc unit 150.
FIG. 2C is a front cross-sectional view along line 2—2 of FIG. 1 showing another version of the shroud 250.

FIG. 3 is a plan cross-sectional view along line 3—3 of FIG. 2 showing the dirty air inlet passage 27, the clean air exhaust passage 28 and the intermediate handle 21 mounted on the outside of the outer cyclone 15.

Figure 4:
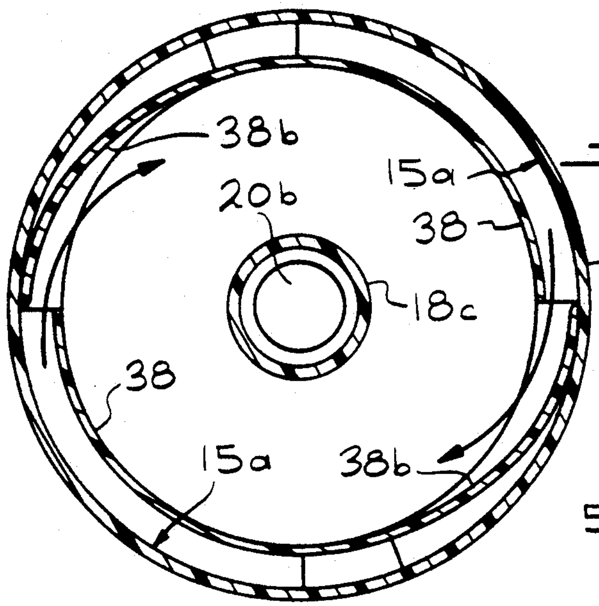

FIG. 4 is a plan cross-sectional view along line 4—4 of FIG. 2 showing the tangential air inlet into the inner cyclone 20.

Figure 5:
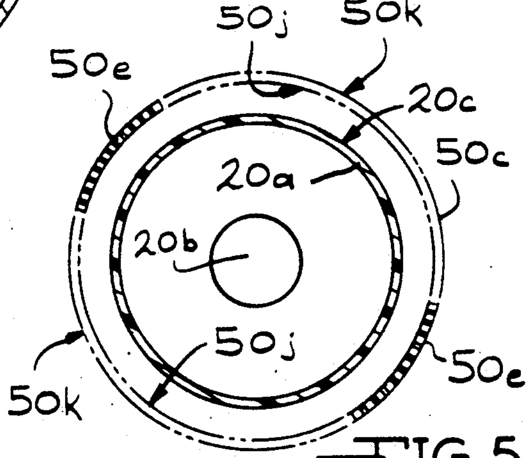

FIG. 5 is a plan cross-sectional view along line 5—5 of FIG. 2 showing the perforated openings 50*e* through the shroud,,member 50*c*.

Figure 6:
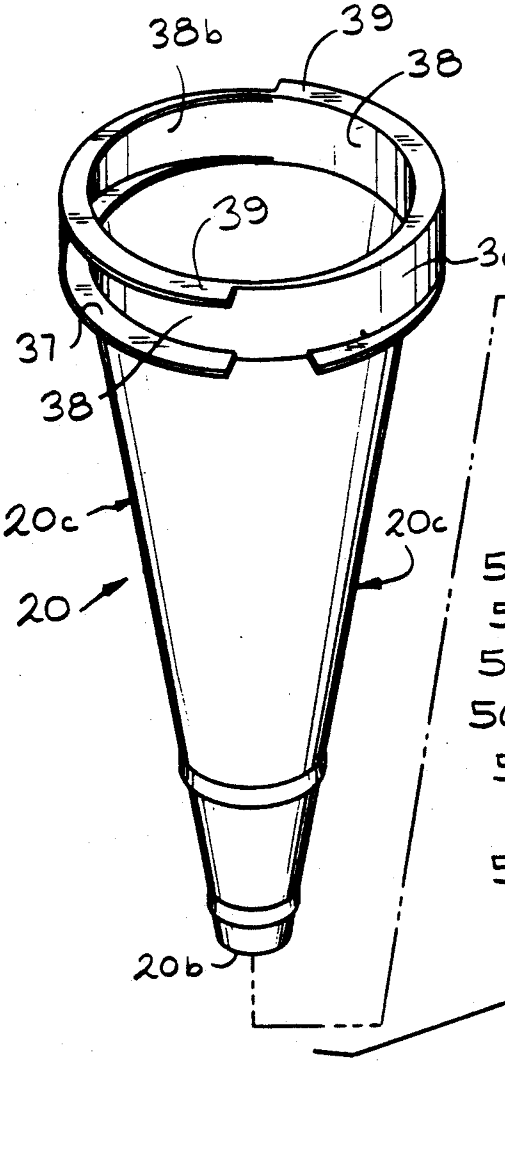
Figure 6:
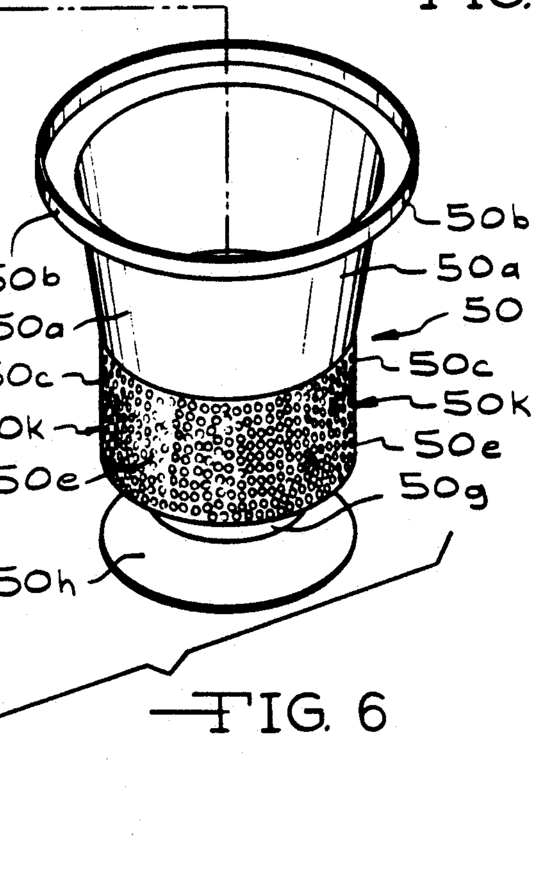

FIG. 6 is a separated perspective view showing the positioning of the inner cyclone 20 inside of the shroud and disc unit 50.

Figure 7:
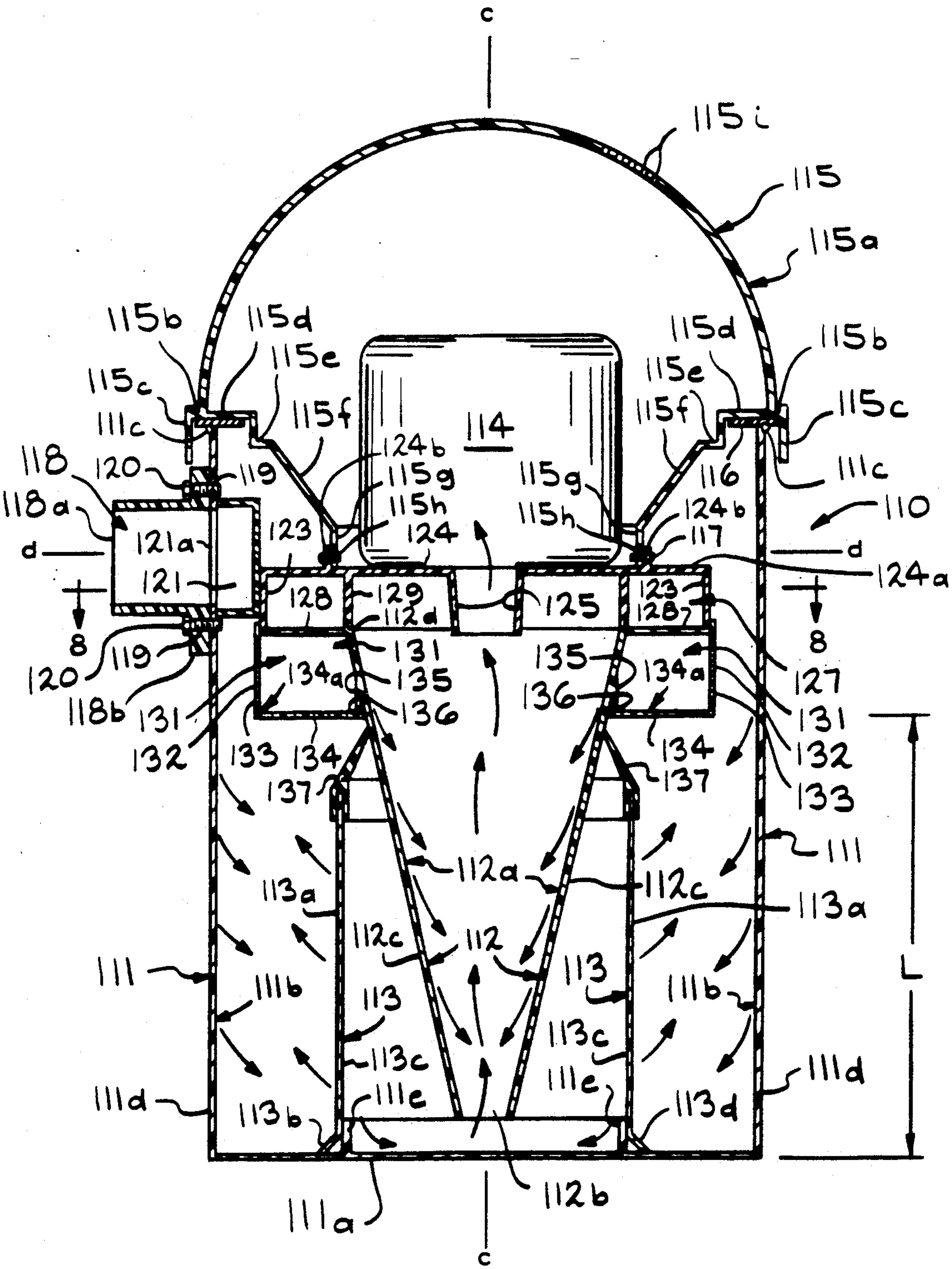

FIG. 7 is a front cross-sectional view of a preferred tank type cleaning apparatus of the present invention and particularly showing an outer cyclone 111, an inner cyclone 112, a dirt collection receiver 113, and an inlet scroll 127 and associated shroud 131 to the inner cyclone 112.

Figure 8:
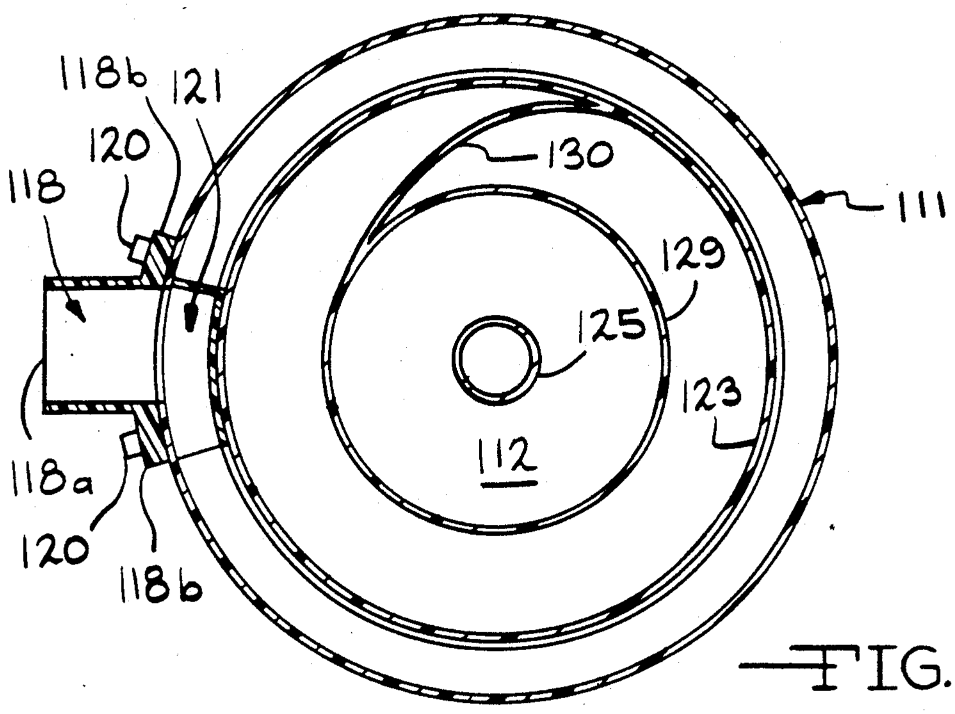

FIG. 8 is a plan cross-sectional view along line 8—8 of FIG. 7 showing the inlet passage 121 to the outer cyclone 111 with spiral member 130 for inlet into the inner cyclone 112.

Figure 8A:
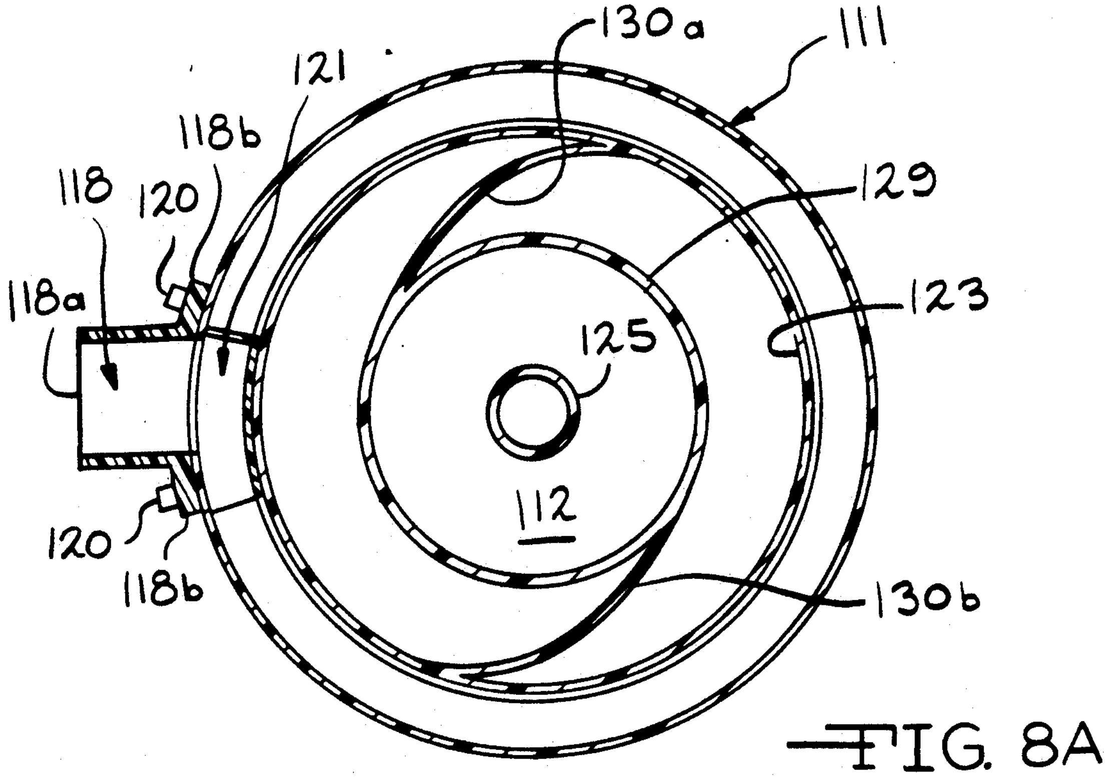

FIG. 8A is a plan cross-sectional view showing the inlet scroll 127 having two spiral members 130*a* and 130*b* rather than one as shown in FIG. 8.

Figure 9:
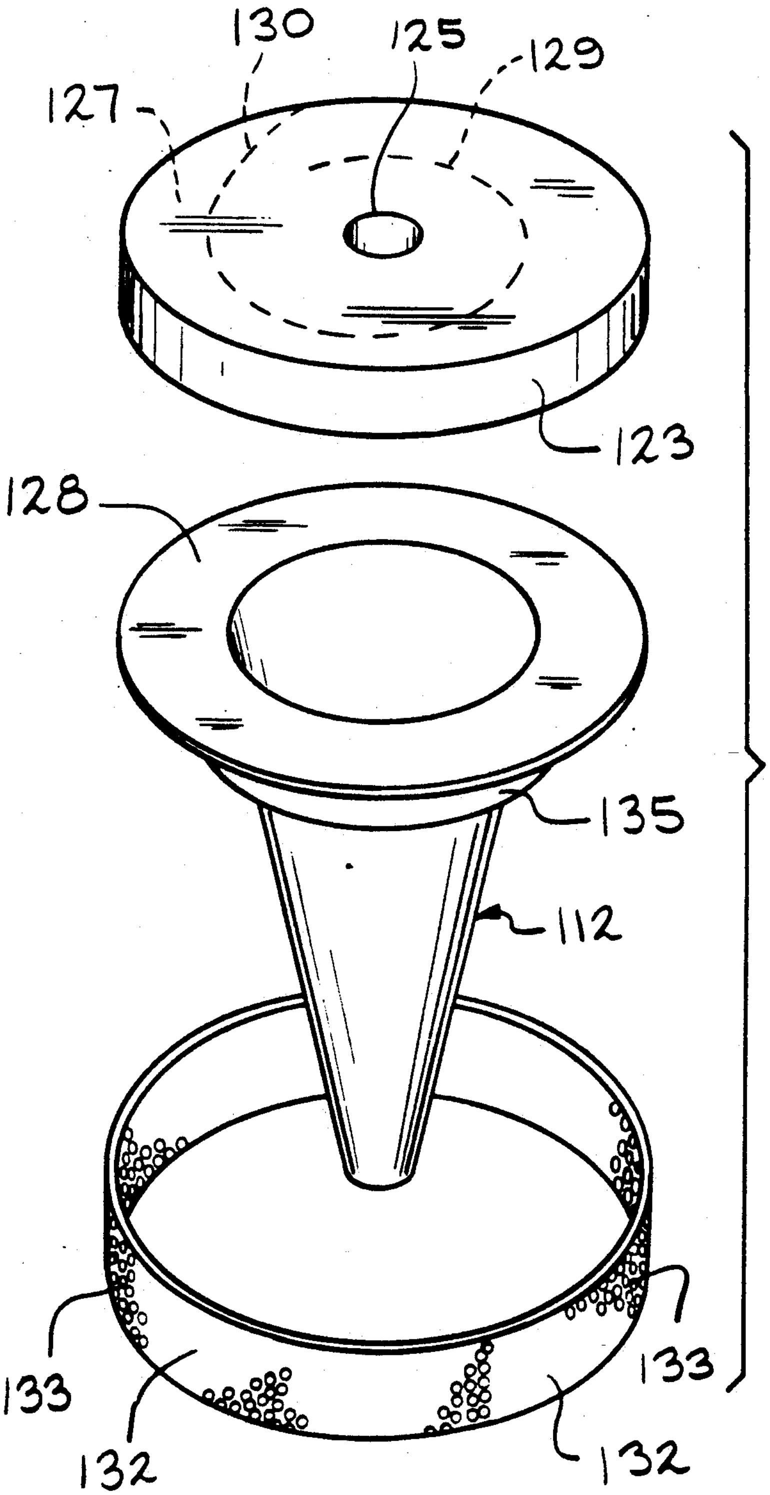

FIG. 9 is an isometric, separated view of the inner cyclone 112, inlet scroll 127, and the ring 132 with openings 133.

Figure 10:
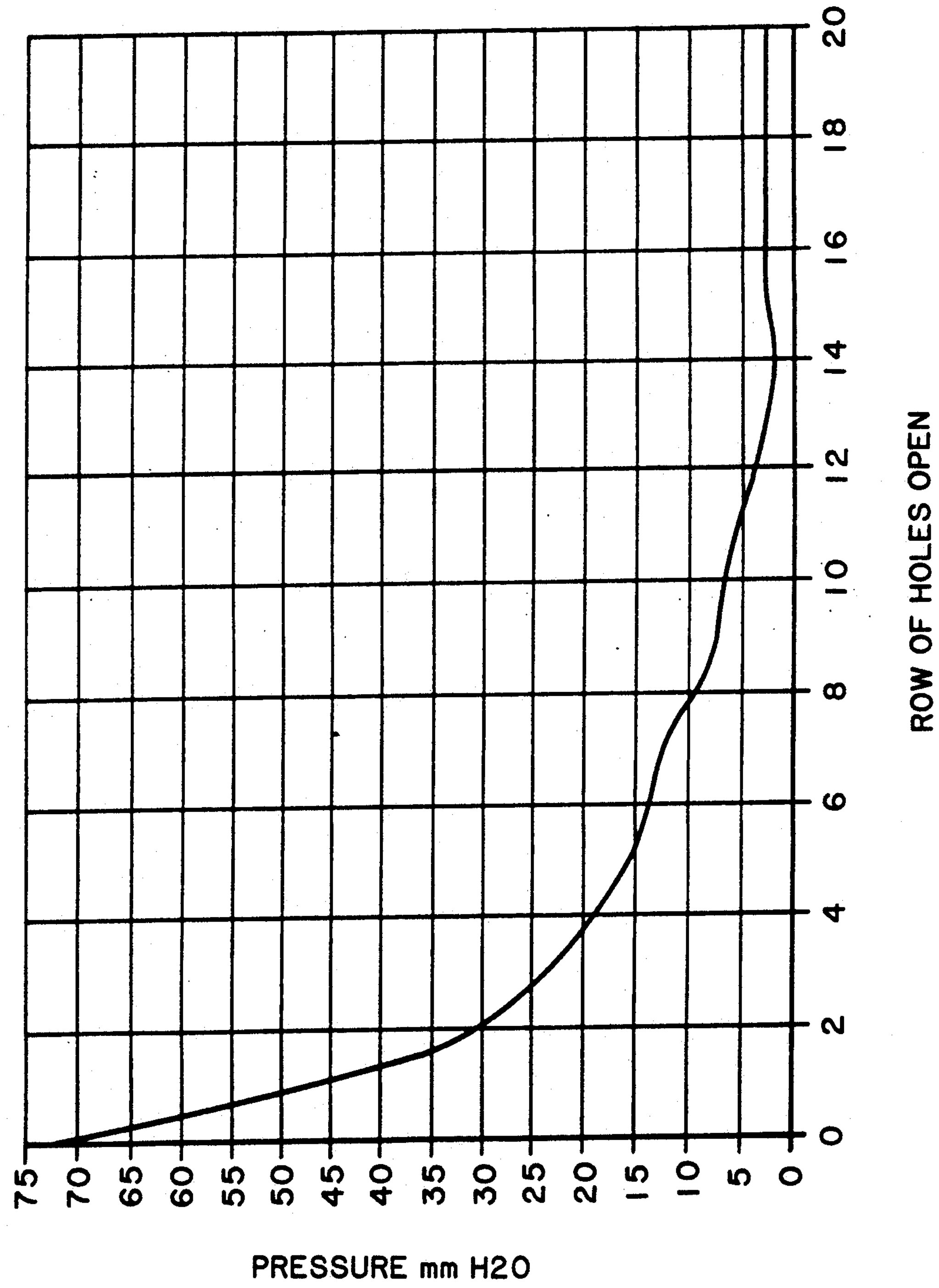

FIG. 10 is a graph showing area of openings 50*e* versus pressure drop across a cylindrical section 50*c* of the shroud and disc unit 50.

GENERAL DESCRIPTION

The present invention relates to an improvement in a cleaning apparatus including a container comprising a bottom and a sidewall extending to and meeting the bottom, the sidewall having an interior surface, a dirty air inlet which is oriented for supplying dirt laden air into the container tangentially to the interior surface of the container which has a circular cross-section and an air outlet from the container; a cross-sectioned cyclone having a longitudinal axis mounted inside the container, the cyclone comprising a cyclone air inlet at an upper end having a first diameter of the cyclone in air communication with the air outlet of the container, an interior dirt rotational surface of frusto-conical shape for receiving an airflow from the air inlet and for maintaining its velocity to a cone opening smaller in diameter than the diameter of the upper end of the cyclone, the air inlet being oriented for supplying air tangentially to the surface, an outer surface of frusto-conical shape, and a cyclone air outlet communicating with the interior of the cyclone adjacent the upper end of the cyclone; a dirt collecting receiver extending from the cone opening; and means for generating an airflow which passes through the casing, the dirty air inlet, the cyclone, the dirt receiver and the cyclone air outlet, the airflow rotating around the frusto-conical interior surface of the cyclone and depositing the dirt in the receiver the improvement which comprises: a shroud means mounted on and around the outer surface of the cyclone, having opposed ends along the longitudinal axis and providing an air outlet from the container into the air inlet to the cyclone, wherein a portion of the shroud has a cylindrical section between the ends with perforations which allow for the flow of the air from the container to the cyclone air inlet and which is spaced from and parallel to the inside wall of the container and wherein the other end of the shroud means is closed.

Further, the present invention relates to a shroud means for use in a cleaning apparatus including a container comprising a bottom and a sidewall extending to and meeting the bottom, the sidewall having an interior surface, a dirty air inlet which is oriented for supplying dirt laden air into the container tangentially to the interior surface of the container which has a circular cross-section and an air outlet from the container; a circular cross-sectioned cyclone having a longitudinal axis mounted inside the container, the cyclone comprising a cyclone air inlet at an upper end having a first diameter of the cyclone in air communication with the air outlet of the container, an interior dirt rotational surface of frusto-conical shape for receiving an airflow from the air inlet and for maintaining its velocity to a cone opening smaller in diameter than the diameter of the upper end of the cyclone, the air inlet being oriented for supplying air tangentially to the surface, an outer surface of frusto-conical shape, and a cyclone air outlet communicating with the interior of the cyclone adjacent the upper end of the cyclone; a dirt collecting receiver extending from the cone opening; and means for generating an airflow which passes sequentially through the dirty air inlet, the container, the cyclone air inlet, the cyclone, the dirt receiver and the cyclone air outlet, the airflow rotating around the frusto-conical interior surface of the cyclone and depositing the dirt in the dirt receiver the improvement which comprises: a shroud means to be mounted on and around the outer surface of the cyclone, having opposed ends along the longitudinal axis and providing an air outlet from the container into the air inlet to the cyclone, wherein a portion of the shroud has a cylindrical section with perforations which allow for the flow of the air from the container to the cyclone inlet and which is spaced from and parallel to the inside wall of the container and wherein the cylindrical section is joined to a web section an inside edge of which contacts the outside wall of the cyclone and an outside edge of which is joined to the cylindrical section.

Figure 1:
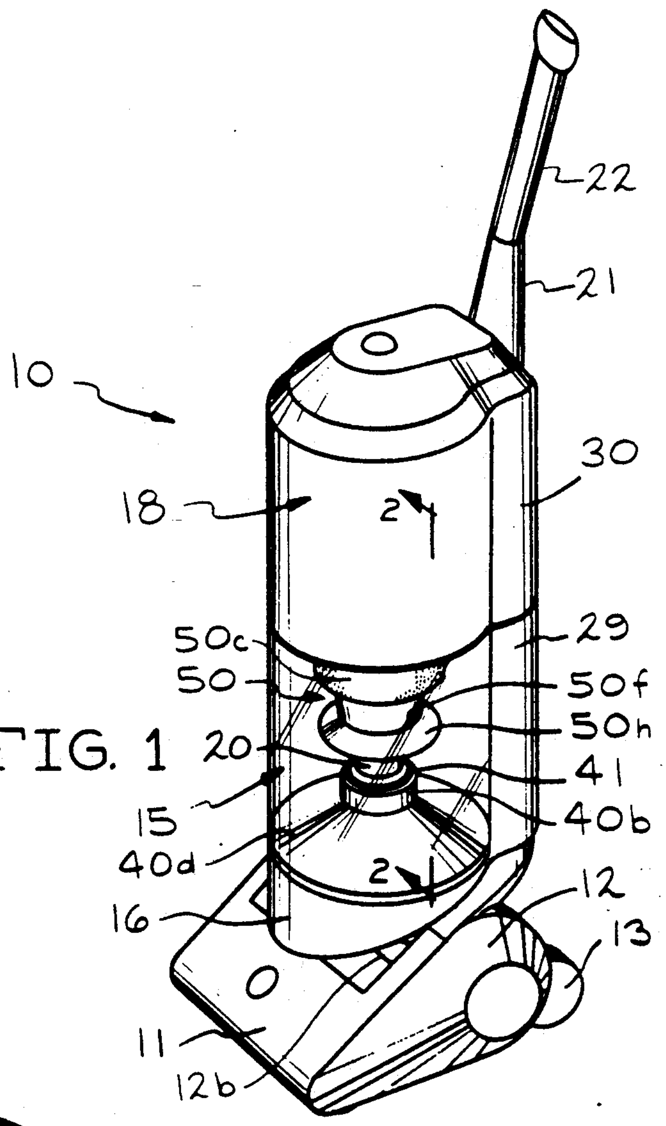

It is unexpected that the perforated section could be directly facing the parallel inside wall of the container and have a relatively close spacing of 0.6 inches to 1.4 inches (1.5 cm to 3.6 cm) to the inside wall and still be so effective in dirt separation. For upright vacuum cleaners as shown in FIGS. 1 and 2, the preferred diameter of the cylindrical section of the wall of the shroud and the diameter of the inside surface of the container is about 4.3 inches and 6.4 inches (10.9 and 16.3 cm), respectively. For tank type vacuum cleaners as shown in FIG. 7, the diameter of the cylindrical section of the wall of the shroud and the diameter of the inside surface of the container is about 8.2 inches and 10.6 inches (20.8 cm and 26.9 cm), respectively.

It was found that as low a pressure drop as possible through the shroud is preferred. This means that a large number of openings, preferably round, should be provided in the perforated section of the shroud.

SPECIFIC DESCRIPTION

FIGS. 1 and 2 show an upright type vacuum cleaning apparatus 10 which is adapted for use in both the vertical mode and the horizontal mode, the vertical mode being illustrated. The functioning of the appliance will be described with reference to this vertical mode. The cleaning appliance 10 includes a cleaning head 11 connected to a casing 12 which supports a motor fan unit (not shown) that is mounted behind conventional floor engaging brushes (not shown) and inside wheels (not shown). Exterior wheels 13 are mounted behind the casing 12.

An outer cyclone or container 15 is mounted on the casing 12. The outer cyclone 15 is preferably made of clear plastic so that a person can see the outer cyclone 15 fill with dirt. The outer cyclone 15 has a circular cross-section along a longitudinal axis a—a and more preferably is cylindrical, or it can be outward tapering if space and dimensions permit. A skirt 16 is mounted on the outer cyclone 15 and extends to the casing 12. The outer cyclone 15 has a bottom wall formed by the frusto-conical section **40*d* of a receiver 40 that tapers downwardly and outwardly from the axis a—a, and a cylindrical inner surface 15*a* (FIG. 3) which extends from the bottom wall 40*d* of the receiver 40. Supported on the outer cyclone 15 is a circular cross-sectioned airflow directing head 18 that is sealed to the end surface of the outer cyclone 15 by a flexible inverted L-shaped seal 19 and an annular lip member 15*c* of the outer cyclone 15 (FIG. 2). Positioned radially inward from the outer cyclone 15 and head 18 is an inner cyclone 20. The outer cyclone 15 and the inner cyclone 20** are preferably relatively long and slender along the longitudinal axis a—a.

The casing 12 is provided with a vertical extension **12*a* (FIG. 3) which forms a rigid socket for slideably receiving the lower end of a tubular pipe or wand 21. The pipe 21 includes a grip 22. When the pipe 21 is fitted in the extension 12*a*, the hand grip 22 enables the appliance to be used as an upright type machine. In contrast, when the pipe 21 is slideably removed from the extension 12*a* the pipe 21** is then used as a cleaner head at the end of a flexible hose (not shown) thus converting the appliance into a cylinder type machine. The conversion of the appliance from one mode of operation to the other and vice versa is described more fully in my U.S. Pat. No. 4,377,882.

Positioned adjacent to the outside wall **15*b* of the outer cyclone 15 and mounting the outside wall 18*a* of the head 18 on opposed sides of pipe 21 are spaced apart dirty air inlet and clean air exhaust passages 27 and 28, respectively. The lower half of dirty air inlet passage 27 is formed by a rigid tube 29 adjacent to the outside wall 15*b* of the outer cyclone 15, as shown in FIG. 1. Tube 29 extends from a dirty air inlet passage (not shown) in casing 12 to a tube 30 mounted on the outside wall 18*a* of the head 18 which forms the upper half of dirty air inlet passage 27, (FIG. 3). Tube 30 communicates through the upper part of the outside wall 18*a* of the head 18 through inlet passage 31 so as to make a tangential entry and set up a swirling, cyclonic flow of air in passage 32 of the head 18 leading to the outer cyclone 15**.

As shown in FIG. 2, depending from the circular plate **18*b* of head 18 is conduit 18*c* which forms a clean air exhaust passage 33 from the inner cyclone 20. Exhaust passage 33 is in communication through head 18** with the upper half of clean air exhaust passage 28 (FIG. 3) which is formed by tube 34 mounted on the outside wall 18*a* of the head 18. The lower part of tube 34 leads to a rigid lower exhaust tube (not shown) which is mounted on the outside wall 15*b* of the outer cyclone 15. The lower exhaust tube (not shown) forms the lower half of clean air exhaust passage 28 and connects to a clean air exhaust outlet (not shown) in the casing 12 which cools the motor fan unit and exhausts at casing vents 12*b* below skirt 16 as shown in FIG. 1.

The inner cyclone 20 has a frusto-conical body extending radially downwardly and inwardly to the axis a—a and an inlet scroll 36. The inner cyclone 20 comprises an inner wall 20*a* leading to a cone opening 20*b* and an outer surface 20*c* of the inner wall 20*a*. The inlet scroll 36 comprises a horizontal web 37 (FIG. 6) which extends from the upper end surface 20*d* of the inner cyclone 20 to the inner surface 18*d* of the head 18. A sleeve 38 extends through the majority of its length from the junction of the upper end surface 20*d* of the inner cyclone 20 and web 37 to the bottom side of plate 18*b*. A second horizontal web 39 extends from the upper end 38*a* of sleeve 38 to the junction where the inside wall 18*d* of head 18 meets plate 18*b*. A portion 38*b* (FIG. 4) of sleeve 38 extends in the form of a spiral, from the junction of the upper end surface 20*d* of the inner cyclone 20 and the web 37 to the inside wall 18*d* of the head 18 thereby completing the inlet scroll 36 and providing a tangential entry to the inner cyclone 20 in order to be capable of setting up a swirling cyclonic flow of air.

The cone opening 20*b* of the inner cyclone 20 is connected to a dirt collecting receiver 40 for collecting dirt from the inner cyclone 20. The lower end of the outer surface 20*c* the inner cyclone 20 engages a circular plate 40*a* which meets a frusto-conical member 40*b* that tapers downwardly and outwardly from the axis a—a. The lower edge of frusto-conical member 40*b* meets the upper edge of a short cylindrical member 40*c* of the receiver 40. Interposed between the inner cyclone 20 and the plate 40*a* of receiver 40 is a flexible annular sealing member 41. Depending from the bottom edge of the cylindrical member 40*c* is the frusto-conical section 40*d* which forms the bottom wall of the outer cyclone 15 and which extends downwardly and outwardly from the axis a—a to the inner surface 15*a* of outer cyclone 15 about 1.1 inches (2.7 cm) above the bottom wall 40*e* of receiver 40. The diameter of the cone opening 20*b* is preferably at least three times the diameter of frusto-conical section 40*d*, as described in U.S. Pat. No. 4,826,515.

Figure 2A:
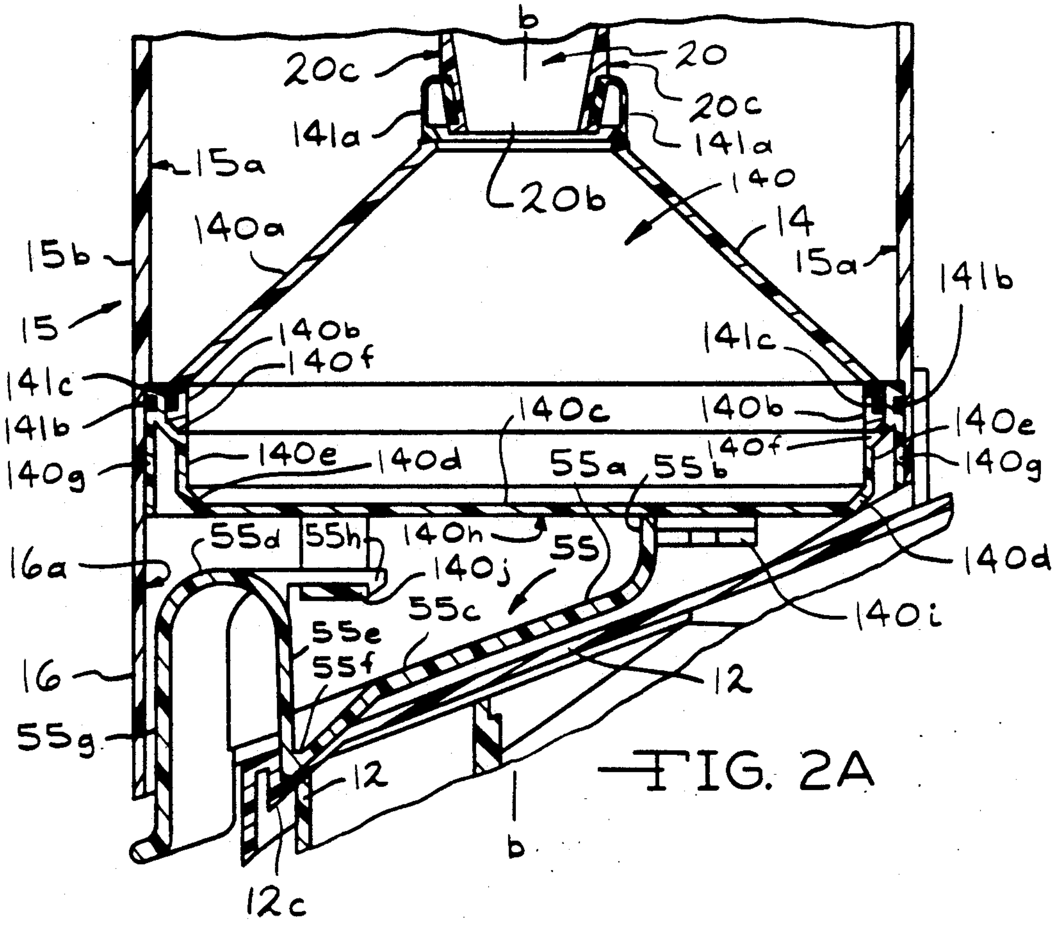

FIG. 2A shows another preferred version of the connection between the cone opening 20*b* of the inner cyclone 20 and a receiver 140 which is similar to receiver 40. The receiver 140 is formed of a frusto-conical section 140*a* secured directly to the cone opening 20*b* through inverted U-shaped annular seal 141*a*. The frusto-conical section 140*a* tapers downwardly and outwardly from the axis b—b to an inner annular ring member 140*b*. A bottom plate 140*c*, circular in plan view, extends to and meets a first frusto-conical member 140*d* which tapers upwardly and outwardly from the axis b—b. The upper edge of the first frusto-conical member 140*d* meets a first cylindrical member 140*e* which extends to and meets a second frusto-conical member 140*f*. The second frusto-conical member 140*f* tapers upwardly and outwardly from the axis b—b to a second cylindrical member 140*g*. The second cylindrical member 140*g* seals against the inner surface 16*a* of skirt 16 through annular ring seal 141*b*. The receiver 140 is completed by annular ring seal 141*c* which is disposed between the inner annular ring member 140*b* and the second cylindrical member 140*g* thereby sealing the outer cyclone 15 from the receiver 140.

A combined shroud and disc unit 50 is mounted intermediate the passage 32 leading to inlet scroll 36 and the cone opening 20*b* as particularly shown in FIG. 2. The upper part of the unit 50 is tapered with wall 50*a* preferably parallel to the outer surface 20*c* of the inner cyclone 20 and forming passage 52. The wall 50*a* ends in a flange 50*b* which surrounds and encloses the inlet passage 32 to the inner cyclone 20. Cylindrical section 50*c* depends from the lower end of wall 50*a* to an annular web 50*d*. A plurality of openings 50*e* (partially shown in FIG. 5) that are in and around the circumference of the cylindrical section 50*c*, serve as an outlet from the outer cyclone 15 to passage 51 leading to passage 52. Web 50*d* extends between the cylindrical section 50*c* and the outer surface 20*c* of the inner cyclone 20 where it meets conical member 50*f* leading to a cylindrical section 50*g*. Depending from the cylindrical section 50*g* is a disc 50*h* which can be conically shaped with a large downwardly tapered portion 50*i* facing the bottom wall 40*d* of the outer cyclone 15. The disc 50*h* can have a downwardly inclined angle alpha between about 97½° to 110° from the axis a—a or 7½° to 20° from a line perpendicular to the axis a—a. The disc 50*h* can also be perpendicular to the axis a—a (not shown).

Figure 2B:
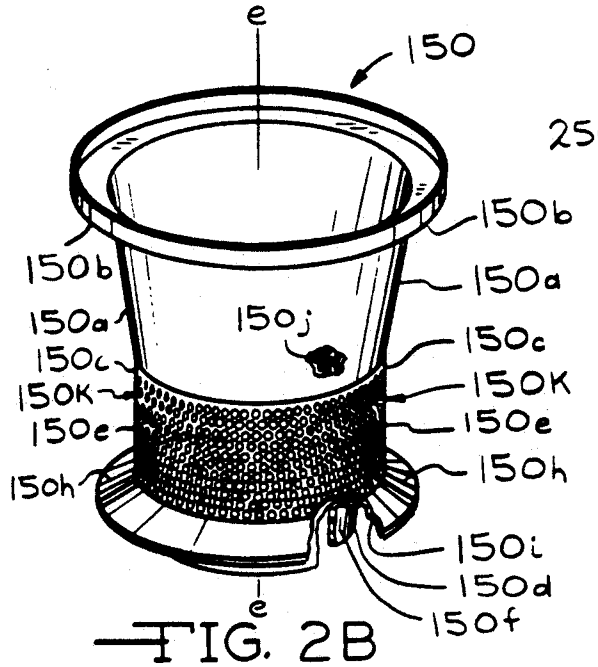

FIG. 2B shows another version of the combined shroud and disc unit 150 that fits over the outer surface 20*c* of the inner cyclone 20, inside of head 18 and the outer cyclone 15, similar to the shroud and disc unit 50 shown in FIG. 2. The upper part of the unit 150 if formed by a frusto-conical section 150*a* that tapers upwardly and outwardly from the axis e—e to a flange 150*b*. A cylindrical section 150*c* depends from the lower end of the frusto-conical section 150*a* to an annular web 150*d*. A plurality of openings 150*e* that are in and around the circumference of the cylindrical section 150*c*, serve as an outlet from the outer cyclone 15. Web 150*d* extends between the cylindrical member 150*c* toward the axis e—e and contacts the outer surface 20*c* of the inner cyclone 20. Web 150*d* meets a conical member 150*f* that together with web 150*d* forms a seal between the inner cyclone 20 and the lower end of the combined shroud and disc unit 150. Extending from the junction of the cylindrical member 150*c* and the web 150*d* is a disc 150*h* which can be conically shaped with a large downwardly tapered portion 150*i*. The disc 150*h* can have a downwardly inclined angle alpha, between about 97½° to 110° from the axis e—e or 7½° to 20° from a line perpendicular to the axis e—e. The disc 150*h* can also be perpendicular to the axis e—e (not shown).

Figure 2C:
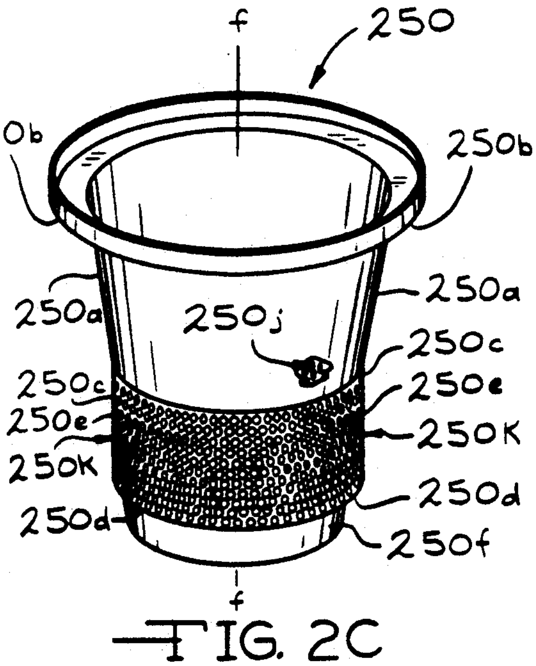

FIG. 2C shows still another version of the shroud unit 250 that fits over the outer surface 20*c* of the inner cyclone 20, inside of head 18 and the outer cyclone 15, similar to the shroud and disc unit 50 shown in FIG. 2. The upper part of the unit 250 is formed by a frusto-conical section 250*a* that tapers upwardly and outwardly from the axis f—f to a flange 250*b*. A cylindrical section 250*c* depends from the lower end of the frusto-conical section 250*a* to an annular web 250*d*. A plurality of openings 250*e* that are in and around the circumference of the section 250*c*, serve as an outlet from the outer cyclone 15. Web 250*d* extends between the cylindrical member 250*c* toward the axis f—f where it contacts the outer surface 20*c* of the inner cyclone 20 similar to web 150*d* of the shroud and disc unit 150 in FIG. 2B. Web 250*d* meets a conical member 250*f* that together with web 250*d* forms a seal between the inner cyclone 20 and the lower end of the combined shroud and disc unit 150. The combined shroud and disc unit 250 does not have a disc to help keep large dirt particles and fibrous matter in the outer cyclone 15 as is characteristic of the shroud and disc unit 50 in FIG. 2 and the shroud and disc unit 150 in FIG. 2B.

In operation of the preferred version of the upright type vacuum cleaning apparatus 10 as shown in FIG. 2, the fan unit in casing 12 pulls air into dirty air inlet passage 27 through tubes 29 and 30 and into inlet passage 31 leading to the outer cyclone 15. The air cyclones down and around the inner surface 15*a* and bottom wall 40*d* of outer cyclone 15, over the outside of walls 40*c*, 40*b* and 40*a* of the receiver 40 and up the outer surface 20*c* of the inner cyclone 20, then over the disc 50*h*, through openings 50*e* and up passages 51 and 52 defined by the shroud 50 and the outer surface 20*c* of the inner cyclone 20. The air then moves into passage 32 before entering the inlet scroll 36 leading to the inner cyclone 20 where the air cyclones down the inner wall 20*a* to the cone opening 20*b* before moving upward to the exhaust passage 33 formed by conduit 18*c*. The air finally moves to the clean air exhaust passage 28 defined by tube 34 and a lower exhaust tube (not shown) adjacent to the outside wall 15*b* of the outer cyclone 15 before exhausting to the atmosphere or to the motor fan unit in the casing 12. The dirt collects on the bottom wall 40*d* of the outer cyclone 15 and on the bottom wall 40*e* of the receiver 40 as shown in FIG. 2. Finer dirt collects primarily in the receiver 40.

It was suprising that the openings 50*e* in the cylindrical section 50*c* (FIG. 2) could be positioned closely adjacent to the inner surface 15*a* of the outer cyclone 15. During testing, it had been thought that the cylindrical section 50*c* should be as distant as possible from the dirt swirling around the inner surface 15*a* of the outer cyclone 15. It had been felt that a large distance between the cylindrical section 50*c* and the inner surface 15*a* of the outer cyclone 15 would make it difficult for dirt, fluff or fibrous material to become caught up in the airflow exiting the outer cyclone 15 through the openings 50*e* in cylindrical section 50*c*. However, with the cylindrical section 50*c* set as far away as possible from the inner surface 15*a* of the outer cyclone 15, fluff and fibrous material became trapped on the outer surface 50*k* of the cylindrical section 50*c*. Surprisingly, it was found that by positioning the cylindrical section 50*c* closely adjacent to the inner surface 15*a* of the outer cyclone 15 that the outer surface 50*k* of the cylindrical section 50*c* did not attract fibrous material and that dirt did not pass directly from the airflow circulating around the inner surface 15*a* of the outer cyclone 15 to the openings 50*e* in cylindrical member 50*c*. In fact, the outer surface 50*k* of the cylindrical member 50*c* was apparently being wiped clean by the airflow circulating around the inner surface 15*a* of the outer cyclone 15. With this construction, the dirt can accumulate to a relatively high level in the outer cyclone 15 (about level L) with good separation of the dirt.

As shown in FIG. 2A, the outer cyclone 15 and receiver 40 (not shown) or receiver 140 are removable from the head 18 for emptying by releasing a spring catch 55 housed within the skirt 16. The catch 55 comprises a central spring arm member 55*a* that attaches at its proximal end 55*b* to the bottom surface 140*h* of the bottom plate 140*c* of the receiver 140 through mounting bracket 140*i*. The distal end 55*c* of the spring arm 55*a* forms into a first inverted U-shaped member 55*d*. The spring arm 55*a* and a proximal leg 55*e* of the first inverted U-shaped member 55*d* form a U-shaped junction 55*f* that secures in a mating locking member 12*c* mounted on the casing 12. A distal leg 55*g* of the first inverted U-shaped member 55*d* acts as a finger grip that protrudes out from underneath the skirt 16 adjacent to the casing 12. A second inverted U-shaped guide member 140*j* is mounted on the bottom surface 140*h* of the bottom plate 140*c* of the receiver 140 spaced apart from mounting bracket 140*i* and adjacent to the apex of the first inverted U-shaped member 55*d*. The second inverted U-shaped member 140*j* serves as a guide for an arrow tab 55*h* extending from the first inverted U-shaped member 55*d* of the catch 55 which helps to secure the receiver 140 and outer cyclone 15 to the head 18 and the inner cyclone 20 when the vacuum cleaning apparatus 10 is being used.

When the outer cyclone 15 and receiver 140 become full of accumulated dirt, the operator lifts up on the distal leg 55*g* of the first inverted U-shaped member 55*d* which releases the junction 55*f* of catch 55 from the locking member 12*c* and the arrow tab 55*h* from the second inverted U-shaped member 140*j*. The operator then pulls the outer cyclone 15, receiver 140 and skirt 16 away from the handle 21 (FIG. 1) which causes the annular lip member 15*c* of the outer cyclone 15 to release from the head 18 at the flexible inverted L-shaped seal 19 and the receiver 140 to release from the inner cyclone 20 at the annular seal 141*a*, thereby exposing the rigid tube 29, the rigid lower exhaust tube (not shown) and the bottom part of the intermediate pipe 21. The outer cyclone 15 and receiver 140 can then be emptied and replaced into the vacuum cleaning apparatus 10 by fitting annular lip member 15*c* of the outer cyclone 15 inside of the flexible inverted L-shaped seal 19 and by fitting annular seal 141*a* around the cone opening 20*b* of the inner cyclone 20. The operator then pushes the outer cyclone 15 and receiver 140 towards the pipe 21 until the junction 55*f* of catch 55 locks into locking member 12*c* of casing 12 and arrow tab 55*h* secures into U-shaped member 140*j*.

FIG. 7 shows a tank type vacuum cleaning apparatus 110, which comprises an outer cyclone 111, around an inner cyclone 112, a dirt collection receiver 113 and a motor driven fan unit 114. The inner and outer cyclones 111 and 112 have circular cross-sections along a longitudinal axis c—c. The outer cyclone 111 has a base 111*a* and a cylindrical inner surface 111*b* which extends from the outer periphery of the base 111*a*. A circular cross-sectioned flange 111*c* extends radially outwardly from the upper end part of the outside wall 111*d* of the outer cyclone 111 and serves as one-half of a seal for the outer cyclone 111.

A removable cover 115 with hemispherical outer surface 115*a* fits over the top of the outer cyclone 111. The lower edge of the outer surface 115*a* of cover 115 has an annular rim 115*b* with a depending lip 115*c* which serves as a hand grip for removing the cover 115 from the outer cyclone 111. Extending inward from rim 115*b* toward the axis a—a is a horizontal support web 115*d* which meets the upper edge of a right angle cross-sectioned protrusion 115*e*. An annular gasket 116 is mounted intermediate the protrusion 115*e* and the rim 115*b* on web 115*d* so as to be in contact with the circular cross-sectioned flange 111*c*. The gasket 116 serves to seal the cover 115 to the outer cyclone 111 while the apparatus 110 is in operation. The lower edge of the protrusion 115*e* meets the top edge of a frusto-conical section 115*f* which tapers radially inwardly and downwardly toward the axis c—c. An annular ring member 115*g* depends from the distal end of the conical section 115*f* and has openings 115*h* for bolts 117. Openings 115*i* are provided on the hemispherical outer surface 115*a* which serve as an exhaust port for the motor fan unit 114.

A cylindrical dirty air inlet passage 118 communicates through the upper part of the outside wall 111*d* of the outer cyclone 111. The end part 118*a* of the dirty air inlet passage 118, remote from the outer cyclone 111, is joined by a flexible tube (not shown) to a cleaner head (not shown) for contacting a dirty surface. Flanged section 118*b* of inlet passage 118, adjacent to the outside wall 111*d* of the outer cyclone 111, has openings 119 for bolts 120 to secure the inlet passage 118 to the outside wall 111*d* of the outer cyclone 111. Inlet passage 118 leads to a dirty air inlet passage 121. As long as inlet passage 121 communicates through the upper part of the outside wall 111*d* of the outer cyclone 111 so as to make a tangential entry and to set up a swirling, cyclonic flow of air in the outer cyclone 111, the exact position of the inlet passage 121 around the circumference of the outer cyclone 111 is not critical.

A plate 124, circular in plan view, with dependent tube 125 centered around the axis c—c is positioned above the inner cyclone 112. The dependent tube 125 extends downwardly along axis c—c from the plate 124 substantially coaxially with the inner cyclone 112. The motor driven fan unit 114 is located on the plate 124 and is arranged so as to draw air from the inner cyclone 112 through dependent tube 125. Extending from the top side 124*a* of the plate 124 is annular ring member 124*b* which is outside of and adjacent to the depending ring member 115*g*. Annular ring 124*b* has openings 126, centered on the axis d—d coinciding with the openings 115*h* in the depending ring member 115*g*, which enables bolts 117 to secure the cover 115 to the plate 124.

The inner cyclone 112 has a frusto-conical body extending radially downwardly and inwardly towards the axis c—c and a dependent inlet scroll 127. The inner cyclone 112 comprises a frusto-conical inner surface 112*a* leading to a cone opening 112*b* and an outside wall 112*c*. The inlet scroll 127 comprises the sleeve 123 which depends from the plate 124 to a horizontal annular web 128 (FIGS. 7 and 8). The web 128 extends between the upper end 112*d* of the frusto-conical body and the lower end part of sleeve 123. A second dependent sleeve 129 extends between the cover 124 and the junction of the upper end 112*d* of the frusto-conical body and the web 128. The second sleeve 129 is located a radially inwardly of the tubular sleeve 123 and through the majority of its length sleeve 129 extends from the upper end 112*d* of the frusto-conical body where the upper end 112*d* joins the inner periphery of the web 128. As shown in FIG. 8, a portion 130 of the second sleeve 129 extends, in the form of a spiral, from the junction of the upper end 112*d* of the frusto-conical body and the web 128 to the tubular sleeve 123 thereby completing the inlet scroll 127 and providing a tangential entry to the inner cyclone 112 in order to be capable of setting up a swirling cyclonic flow of air.

FIG. 8A shows another version of the inlet scroll 127 where two diametrically opposed sections 130*a* and 130*b* extend from the junction of the upper end 112*d* of the frusto-conical body and the web 128 to the tubular sleeve 123. In this manner, the inner cyclone 112 is provided with two opposed tangential entry points which are capable of setting up a swirling, cyclonic flow of air. It should be noted, that the inlet scroll 127 can be completed by any number of sections 130 spiraling radially outwardly from the sleeve 129 to the tubular sleeve 123 as long as the sections 130 create a tangential entry point to the inner cyclone 112.

Depending from the scroll 127 and spaced from the outside wall 112*c* of the inner cyclone 112 is a shroud 131 which comprises of tubular ring 132 that depends from the junction of the tubular sleeve 123 and the web 128. The ring 132 of shroud 131 is totally perforated with a plurality of openings 133 (partially shown in FIG. 9) that serve as an air outlet from the outer cyclone 111 to scroll 127 leading into the inner cyclone 112. The tubular ring 132 is parallel to and purposely spaced from the inner surface 111*b* of the outer cyclone 111. The shroud 131 is completed by a web 134 that extends between the lower end portion of ring 132 and the outside wall 112*c* of the inner cyclone 112 and a cylindrical support member 135 that depends from the outside wall 112*c* of the inner cyclone 112 and which with the upper surface 134*a* of the web 134 forms a right angle closure from the outer cyclone 111 at an intermediate seal 136.

The dirt collection receiver 113 for the inner cyclone 112 comprises a cylindrical portion 113*a* which meets the upper edge of a frusto-conical section 113*b* extending downwardly and outwardly from the axis c—c to the base 111*a* of outer cyclone 111. Adjacent to and radially inward from frusto-conical section 113*b* is an annular ring member 111*e* of the outer cyclone 111 which extends beyond the upper edge of frusto-conical section 113*b* adjacent to the inside wall 113*c* of the receiver 113, thus forming a seal between the receiver 113 and the outer cyclone 111. The cylindrical portion 113*a* is intermediate the inner surface 111*b* of the outer cyclone 111 and the outside wall 112*c* of the inner cyclone 112 and is below the web 134 of the shroud 131. The receiver 113 is completed by a rubber seal 137 that extends from the top of the cylindrical portion 113*a* to the outside wall 112*c* of the inner cyclone 112 adjacent to the web 134. In another embodiment (not shown), cylindrical portion 113*a* can meet and seal against the web 134 of the shroud 131.

The following are parameters for the preferred vacuum cleaner:

1. Number of Holes in Shroud

In the preferred version of the upright type vacuum cleaning apparatus 10, as shown in FIG. 2, and the preferred version of the tank type vacuum cleaning apparatus 110 as shown in FIG. 7, there should be approximately the number and size of openings or holes 50*e* in the cylindrical section 50*c* of the shroud and disc unit 50 and openings 133 in the tubular ring 132 shroud 131 to position the pressure between the inner surface 50*j* and the outer surface 50*k* of the cylindrical section 50*c* and to position the pressure through the ring 132 of shroud 131 as far along from the pressure increase rise of the graph (FIG. 10) as possible. It was found that if there was a high differential pressure through the cylindrical section 50*c* and through the ring 132 of shroud 131 that large dirt particles that collect in the outer cyclones 15 and 111 when the dirt level in the outer cyclones 15 and 111 is below level L, will be pulled through the openings 50*e* in cylindrical section 50*c* and the openings 133 in the tubular ring 132 of shroud 131 where they will then enter the inner cyclones 20 and 112. The high differential pressure probably causes large particles and fluff to attach to and block the openings 50*e* in the cylindrical section 50*c* of the shroud and disc unit 50 and the openings 133 in the tubular ring 132 of shroud 131. This result is undesirable because the large dirt particles will not separate out in the inner cyclones 20 and 112. Instead, the large dirt particles will be expelled out the exhaust passage 33 of the inner cyclone 20 and through dependent tube 125 exhausting from the inner cyclone 112 where the large dirt particles will then be drawn into the motor fan units 14 and 114. This will damage the motor fan units 14 and 114 and can also result in dirt being expelled into the atmosphere.

The above discussion is also applicable for the pressure between the inside surface 150*j* and the outside surface 150*k* of the cylindrical section 150*c* (FIG. 2B) and for the pressure between the inside surface 250*j* and the outside surface 250*k* of the cylindrical section 250*c* (FIG. 2C).

The circumference of the cylindrical section 50*c* of shroud and disc unit 50 in FIG. 2 was 13.6 inches (34.5 cm), the diameter was 4.3 inches (10.9 cm), and the height was 2.6 inches (6.6 cm). Where there were approximately 58 holes per row, a combination lying in the range of 32 to 38 rows of holes of 2.2 mm diameter were found to be best for the cylindrical section 50*c* of the shroud and disc unit 50 of the cleaning apparatus 10 shown in FIGS. 1 and 2. Also, the circumference of the ring 132 of the shroud 131 of the tank type vacuum cleaning apparatus 110 shown in FIG. 7 was 15.5 inches (64.8 cm), the diameter was 8.2 inches (20.8 cm), and the height was 2.5 inches (6.4 cm). Where there were approximately 208 holes per row, a combination lying on the range of 34 to 38 rows of holes of 2.2 mm diameter were found to be best for the ring 132 of the shroud 131. A 2.2 mm diameter hole is sufficiently small to block the passage of particles of a greater size than would be successfully separated by the inner cyclone 20 of FIG. 2 and the inner cyclone 112 of FIG. 7.

It was believed that the greater the total area of holes 50*e* and 133 the less pressure there would be at each hole. This is beneficial because the cylindrical section 50*c* and the ring 132 of the shroud 131 would be better at not attracting fluff. Also, a lower pressure at each opening 50*e* of the upright type vacuum cleaning apparatus 10 and at each opening 133 of the ring 132 of the shroud 131 of the tank type vacuum cleaning apparatus 110 would make it easier for fine dirt to gather at and maybe block rather than be drawn through the openings 50*e* and 133, thereby signalling the operator that it is time to empty the respective vacuum cleaners 10 and 110.

2. Thickness of Material for the Shroud

It was found that better results were obtained when material at least 2 mm thick was used for the shrouds 50 and 131 . Material 1 mm thick did not work as well. It was assumed that the thicker material causes a sharper change in direction for the clean air and therefore contributes to a better separation than is achieved by the thinner material.

3. Distance Between the Shroud and the Inner Surface of the Outer Cyclone

For the upright type vacuum cleaner 10 in FIG. 1 and 2, the distance range between the cylindrical section 50*c* of the shroud and disc unit 50 and the inner surface 15*a* of the outer cyclone 15 is preferably between 0.59 inches to 1.18 inches (1.5 cm to 3.0 cm). For the tank type vacuum cleaning apparatus 110 in FIG. 7, the distance range between the ring 132 of the shroud 131 and the inner surface 111*b* of the outer cyclone 111 is preferably between 0.75 inches to 1.26 inches (1.9 cm to 3.2 cm). However, if the distance between the cylindrical section 50*c* of the shroud and disc unit 50 is too close, fluff will bridge between the disc 50*h* and the inner surface 15*a* of the outer cyclone 15. Alternatively, if the distance is too great, fluff attaches to the cylindrical section 50*c* and blocks the openings 50*e*. The exact distances is dependent on the diameter of the outer cyclone and the inner cyclone of the respective vacuum cleaning apparatus 10 and 110.

It is intended that the foregoing description be only illustrative of the present invention and that the present invention be limited only to the hereinafter appended claims.

I claim:

1. In a cleaning apparatus including a container comprising a bottom and a sidewall extending to and meeting the bottom, the sidewall having an interior surface, a dirty air inlet which is oriented for supplying dirt laden air into the container tangentially to the interior surface of the container which has a circular cross-section and an air outlet from the container; a cross-sectioned cyclone having a longitudinal axis mounted inside the container, the cyclone comprising a cyclone air inlet at an upper end having a first diameter of the cyclone in air communication with the air outlet of the container, an interior dirt rotational surface of the frusto-conical shape for receiving an airflow from the air inlet and for maintaining its velocity to a cone opening smaller in diameter than the diameter of the upper end of the cyclone, the air inlet being oriented for supplying air tangentially to the surface, an outer surface of frusto-conical shape, and a cyclone air outlet communicating with the interior of the cyclone adjacent the upper end of the cyclone; a dirt collecting receiver extending from the cone opening; and means for generating an airflow which passes sequentially through the dirty air inlet, the container, the cyclone air inlet, the cyclone, the dirt receiver and the cyclone air outlet, and airflow rotating around the frusto-conical interior surface of the cyclone and depositing the dirt in the receiver the improvement which comprises:

(a) a shroud means mounted on and around the outer surface of the cyclone, having opposed ends along the longitudinal axis and providing an air outlet from the container into the air inlet to the cyclone, wherein a portion of the shroud means has a cylindrical section between the ends with perforations around the cylindrical section which allow for the flow of the air from the container to the cyclone air inlet and which is spaced from and parallel to the inside wall of the container with one of the ends of the shroud means closed by the outer surface of the cyclone and wherein the airflow circulating around the interior surface of the container wipes an outer surface of the cylindrical section around the perforations clean so that the flow of the air from the container to the cyclone inlet is not restricted by dirt accumulating at the perforations in the cylindrical section as dirt is being accumulated in the container.

2. The apparatus of claim 1 wherein there are a large number of the perforations through the cylindrical section so as to create a low differential pressure between an outside surface and an inside surface of the cylindrical section so that large dirt particles are not drawn through the perforations in the cylindrical section by the flow of air from the container to the cyclone air inlet.

3. The apparatus of claim 2 wherein the cylindrical section of the shroud means is joined to a web means, an inside edge of which contacts the outside wall of the cyclone and an outside edge of which is joined to the cylindrical section and wherein the web means is a first disc means provided at a lower longitudinal extent of the shroud means below the air inlet of the cyclone, wherein the first disc means aids in dirt removal in the container by preventing some of the dirt from flowing into the air inlet to the cyclone.

4. The apparatus of claim 3 wherein the dirty air inlet into the container is provided above the perforations through the cylindrical section of the shroud means.

5. The apparatus of claim 2 wherein the dirty air inlet into the container is provided above the perforations through the cylindrical section of the shroud means.

6. The apparatus of claim 2 wherein the shroud means has a flanged section above the cylindrical section and around the longitudinal axis at an end adjacent the air inlet to the cyclone which is in a closely spaced relationship to the outside wall of the cyclone so as to provide a chamber leading to the air inlet to the cyclone.

7. The apparatus of claim 3 wherein a second disc means is provided at a lower longitudinal extent of the shroud means, below the air inlet of the cyclone and the first disc means, and around the axis of the cyclone with a space between the interior surface of the container and the second disc means for passage of air, wherein the second disc means aids in dirt removal in the container by preventing some of the dirt from flowing into the air inlet to the cyclone.

8. The apparatus of claim 7 wherein the second disc means is circular in cross-section around the longitudinal axis of the cyclone.

9. The apparatus of claim 7 wherein the second disc means has a conical shape around the shroud means such that a larger portion of the conical shape faces towards the bottom of the container.

10. The apparatus of claim 7 wherein the conical shape when viewed as a cross-section of the shroud means and second disc means through the longitudinal axis is at a downwardly inclined angle of about 7½ to 20° from a line perpendicular to the longitudinal axis of the cyclone.

11. The apparatus of claim 7 wherein the second disc means is positioned about one-third of the distance between the cone opening and the air inlet of the cyclone.

12. The apparatus of claim 2 wherein the dirt receiver is mounted on the outer surface of the cyclone and has a conical portion adjacent the bottom of the container which tapers outwardly towards the sidewall and the bottom of the container.

13. The apparatus of claim 12 wherein the dirt receiver has a cylindrical portion which extends from an outer edge of a circular plate portion, an inner edge of which contacts the outside surface of the cyclone adjacent the cone opening wherein the cylindrical portion extends to the conical portion.

14. The apparatus of claim 13 wherein the web means is a first disc means provided at a lower longitudinal extent of the shroud means below the air inlet of the cyclone, wherein the first disc means aids in dirt removal in the container by preventing some of the dirt from flowing into the air inlet to the cyclone and wherein the cylindrical portion of the dirt receiver has a diameter smaller than a diameter of a second disc means, the second disc means provided at a lower longitudinal extent of the shroud means, below the air inlet of the cyclone and the first disc means, and around the axis of the cyclone with a space between the interior surface of the container and the second disc means for passage of air, wherein the second disc means aids in dirt removal in the container by preventing some of the dirt from flowing into the air inlet to the cyclone.

15. The apparatus of claim 2 wherein the container has a substantially cylindrical sidewall.

16. The apparatus of claim 2 as an upright type vacuum cleaner with a handle wherein the airflow generating means is mounted in a casing that supports the container, cyclone and dirt receiver and wherein the floor engaging cleaner head contacts a surface to be cleaned and an airflow control cover is mounted on an open end of the container for directing airflow of dirt-laden air into the container and for directing airflow out of the outlet from the cyclone.

17. The apparatus of claim 16 wherein the casing is provided with two sets of wheels for moving the vacuum cleaning apparatus which set of wheels are mounted on opposed sides of the airflow generating means.

18. The apparatus of claim 16 wherein separate tubes are mounted on the outside of the container parallel to the longitudinal axis of the container and wherein the separate tubes are on opposed sides of and in a closely spaced relationship to the handle wherein said tubes are in airflow communication with the cover so that one tube serves as a dirty air inlet to the container and wherein clean air from the cyclone is removed through the other tube and is used to cool the airflow generating means.

19. The apparatus of claim 7 wherein the shroud means and the second disc means form an integral unit which slides over the outside surface of the cyclone such that the cone opening protrudes below and out of the unit and wherein a lower section of the shroud means depending from a radius of the first disc means of the shroud means supports the second disc means and is in a sealed relationship with the outside wall of the cyclone so that the airflow in the container must travel over the second disc means and past an outside surface of a lower section of the shroud means before passing through the perforations in the cylindrical section leading to the air inlet to the cyclone.

20. The apparatus of claim 19 wherein the perforations through the cylindrical section are circular and are provided around a circumferential extent of the cylindrical section of the shroud means.

21. The apparatus of claim 19 wherein there are a large number of the perforations through the cylindrical section so as to create a low differential pressure between an outside surface and an inside surface of the cylindrical section so that dirt is not drawn through the cylindrical section by the flow of air from the container to the cyclone air inlet.

22. The apparatus of claim 19 wherein the perforated section of the shroud means is between 0.59 inches and 1.38 inches (1.5 cm and 3.5 cm) from the inside wall of the container.

23. The apparatus of claim 19 wherein the shroud means has a flanged section above the cylindrical section and around the longitudinal axis at an end adjacent the air inlet to the cyclone which is in a closely spaced relationship to the outside wall of the cyclone so as to provide a chamber leading to the air inlet to the cyclone.

24. A shroud means for use in a cleaning apparatus including a container comprising a bottom and a sidewall extending to and meeting the bottom, the sidewall having an interior surface, a dirty air inlet which is oriented for supplying dirt laden air into the container tangentially to the interior surface of the container which has a circular cross-section and an air outlet from the container; a circular cross-sectioned cyclone having a longitudinal axis mounted inside the container, the cyclone comprising a cyclone air inlet at an upper end having a first diameter of the cyclone in air communication with the air outlet of the container, an interior dirt rotational surface of frusto-conical shape for receiving an air flow from the air inlet and for maintaining its velocity to a cone opening smaller in diameter than the diameter of the upper end of the cyclone, the air inlet being oriented for supplying air tangentially to the surface, an outer surface of frusto-conical shape, and a cyclone air outlet communicating with the interior of the cyclone adjacent the upper end of the cyclone; a dirt collecting receiver extending from the cone opening; and means for generating an airflow which passes sequentially through the dirty air inlet, the cover, the container, the cyclone air inlet, the cyclone, the dirt receiver and the cyclone air outlet, the airflow rotating around the frusto-conical interior surface of the cyclone and depositing the dirt in the receiver the improvement which comprises:

(a) the shroud means mounted on and around the outer surface of the cyclone, having opposed ends along the longitudinal axis and providing an air outlet from the container into the air inlet to the cyclone, wherein a portion of the shroud means has a cylindrical section with a large number of perforations around the cylindrical section, spaced from the inside wall of the container which results in a low differential pressure being created between an outside surface and an inside surface of the cylindrical section that keeps dirt from being drawn through the perforations in the cylindrical section by the flow of air from the container to the cyclone air inlet with one of the ends of the shroud means closed by the outer surface of the cyclone and wherein the airflow circulating around the interior surface of the container wipes the outside surface of the cylindrical section around the perforations clean so that the flow of the air from the container to the cyclone inlet is not restricted by dirt accumulating at the perforations in the cylindrical section as dirt is being accumulated in the container.

25. A shroud means for use in a cleaning apparatus including a container comprising a bottom and a sidewall extending to and meeting the bottom, the sidewall having an interior surface, a dirty air inlet which is oriented for supplying dirt laden air into the container tangentially to the interior surface of the container which has a circular cross-section and an air outlet from the container; a circular cross-sectioned cyclone having a longitudinal axis mounted inside the container, the cyclone comprising a cyclone air inlet at an upper end having a first diameter of the cyclone in air communication with the air outlet of the container, an interior dirt rotational surface of frusto-conical shape for receiving an air flow from the air inlet and for maintaining its velocity to a cone opening smaller in diameter than the diameter of the upper end of the cyclone, the air inlet being oriented for supplying air tangentially to the surface, an outer surface of frusto-conical shape, and a cyclone air outlet communicating with the interior of the cyclone adjacent the upper end of the cyclone; a dirt collecting receiver extending from the cone opening; and means for generating an airflow which passes sequentially through the dirty air inlet, the cover, the container, the cyclone air inlet, the cyclone, the dirt receiver and the cyclone air outlet, the airflow rotating around the frusto-conical interior surface of the cyclone and depositing the dirt in the receiver the improvement which comprises:

(a) the shroud means mounted on and around the outer surface of the cyclone, having opposed ends along the longitudinal axis and providing an air outlet from the container into the air inlet to the cyclone, wherein a portion of the shroud means has a cylindrical section with perforations around the cylindrical section which allow for the flow of the air from the container to the cyclone inlet and which is spaced from and parallel to the inside wall of the container with one of the ends of the shroud means closed by the outer surface of the cyclone and wherein the airflow circulating around the interior surface of the container wipes an outer surface of the cylindrical section around the perforations clean so that the flow of the air from the container to the cyclone inlet is not restricted by dirt accumulating at the perforations in the cylindrical section as dirt is being accumulated in the container.

26. A shroud means for use in a cleaning apparatus including a container comprising a bottom and a sidewall extending to and meeting the bottom, the sidewall having an interior surface, a dirty air inlet which is oriented for supplying dirt laden air into the container tangentially to the interior surface of the container which has a circular cross-section and an air outlet from the container; a circular cross-sectioned cyclone having a longitudinal axis mounted inside the container, the cyclone comprising a cyclone air inlet at an upper end having a first diameter of the cyclone in air communication with the air outlet of the container, an interior dirt rotational surface of frusto-conical shape for receiving an airflow from the air inlet and for maintaining its velocity to a cone opening smaller in diameter than the diameter of the upper end of the cyclone, the air inlet being oriented for supplying air tangentially to the surface, an outer surface of frusto-conical shape, and a cyclone air outlet communicating with the interior of the cyclone adjacent the upper end of the cyclone; a dirt collecting receiver extending from the cone opening; and means for generating an airflow which passes sequentially through the dirty air inlet, the container, the cyclone air inlet, the cyclone, the dirt receiver and the cyclone air outlet, the airflow rotating around the frusto-conical interior surface of the cyclone and depositing the dirt in the receiver the improvement which comprises:

the shroud means mounted on and around the outer surface of the cyclone, having opposed ends along the longitudinal axis and providing an air outlet from the container into the air inlet to the cyclone, wherein a portion of the shroud means has a cylindrical section with perforations around the cylindrical section which allow for the flow of the air from the container to the cyclone inlet and which is spaced from and parallel to the inside wall of the container with the cylindrical section joined to a web means, an inside edge of which contacts the outside wall of the cyclone and an outside edge of which is joined to the cylindrical section and wherein the airflow circulating around the interior surface of the container wipes an outer surface of the cylindrical section around the perforations clean so that the flow of the air from the container to the cyclone inlet is not restricted by dirt accumulating at the perforations in the cylindrical section as dirt is being accumulated in the container.

27. The shroud means of claim 26 wherein the perforations through the cylindrical section are circular and are provided around a circumferential extent of the cylindrical section of the shroud means.

28. The apparatus of claim 26 wherein there are a large number of the perforations through the cylindrical section so as to create a low differential pressure between an outside surface and an inside surface of the cylindrical section so that dirt is not drawn through the cylindrical section by the flow of air from the container to the cyclone air inlet.

29. The apparatus of claim 26 wherein the perforated section of the shroud means is between 0.59 inches and 1.38 inches (1.5 cm and 3.5 cm) from the inside wall of the container.

30. The shroud means of claim 26 wherein the shroud means has a flanged section above the cylindrical section and around the longitudinal axis at an end adjacent the air inlet to the cyclone which is in closely spaced relationship to the outside of the cyclone so as to provide a chamber leading to the inlet to the cyclone.

31. The shroud of claim 26 wherein the web means is a first disc means provided at a lower longitudinal extent of the shroud means below the air inlet of the cyclone, wherein the first disc means aids in dirt removal in the container by preventing some of the dirt from flowing into the air inlet to the cyclone.

32. The shroud means of claim 31 wherein a second disc means is provided at a lower longitudinal extent of the shroud means, below the air inlet of the cyclone and the first disc means, and around the axis of the cyclone with a space between the interior surface of the container and the second disc means for passage of air, wherein the second disc means aids in dirt removal in the container by preventing some of the dirt from flowing into the air inlet to the cyclone.

33. The shroud means of claim 32 wherein the shroud means and the second disc means form an integral unit which slides over the outside surface of the cyclone such that the cone opening protrudes below and out of the unit and wherein a lower section of the shroud means depending from a radius of the first disc means of the shroud means supports the second disc means and is in sealed relationship with the outside wall of the cyclone so that the airflow in the container must travel over the second disc means and past an outside surface of a lower section of the shroud means before passing through the perforations in the cylindrical section leading to the air inlet to the cyclone.

34. The shroud means of claim 32 wherein the perforations through the cylindrical section are circular and are provided around the circumferential extent of the cylindrical section of the shroud means which is parallel to the inside wall of the container.

35. The apparatus of claim 32 wherein there are a large number of the perforations through the cylindrical section so as to create a low differential pressure between an outside surface and an inside surface of the cylindrical section so that dirt is not drawn through the cylindrical section by the flow of air from the container to the cyclone air inlet.

36. The apparatus of claim 26 wherein the dirty air inlet into the container is provided above the perforations through the cylindrical section of the shroud means.

37. In a cleaning apparatus including a container comprising a bottom and a sidewall extending to and meeting the bottom, the sidewall having an interior surface, a dirty air inlet which is oriented for supplying dirt laden air into the container tangentially to the interior surface of the container which has a circular cross-section and an air outlet from the container; a cross-sectioned cyclone having a longitudinal axis mounted inside the container, the cyclone comprising a cyclone air inlet at an upper end having a first diameter of the cyclone in air communication with the air outlet of the container, an interior dirt rotational surface of frusto-conical shape for receiving an airflow from the air inlet and for maintaining its velocity to a cone opening smaller in diameter than the diameter of the upper end of the cyclone, the air inlet being oriented for supplying air tangentially to the surface, an outer surface of frusto-conical shape, and a cyclone air outlet communicating with the interior of the cyclone adjacent the upper end of the cyclone; a dirt collecting receiver extending from the cone opening; and means for generating an airflow which passes sequentially through the dirty air inlet, the container, the cyclone air inlet, the cyclone, the dirt receiver and the cyclone air outlet, the airflow rotating around the frusto-conical interior surface of the cyclone and depositing the dirt in the receiver the improvement which comprises:

(a) a shroud means mounted on and around the outer surface of the cyclone, having opposed ends along the longitudinal axis and providing an air outlet from the container into the air inlet to the cyclone, wherein a portion of the shroud means has a cylindrical section between the ends with perforations around the cylindrical section which allow for the flow of the air from the container to the cyclone air inlet and which is spaced from and parallel to the inside wall of the container with the cylindrical section joined to a web means, an inside edge of which contacts the outside wall of the cyclone and an outside edge of which is joined to the cylindrical section and wherein the airflow circulating around the interior surface of the container wipes an outer surface of the cylindrical section around the perforations clean so that the flow of the air from the container to the cyclone inlet is not restricted by dirt accumulating at the perforations in the cylindrical section as dirt is being accumulated in the container.

38. The apparatus of claim 37 wherein the perforations through the cylindrical section are circular and are provided around a circumferential extent of the cylindrical section of the shroud means.

* * * * *